United States Patent [19]
Girodat

[11] 3,805,798
[45] Apr. 23, 1974

[54] COMBINE HARVESTER PROTECTION SYSTEM

[75] Inventor: Joseph C. F. Girodat, Mississauga, Ontario, Canada

[73] Assignee: Massey-Ferguson Industries Limited, Toronto, Ontario, Canada

[22] Filed: Nov. 8, 1972

[21] Appl. No.: 304,688

[52] U.S. Cl. .......... 130/27 JT, 56/DIG. 15, 56/10.2
[51] Int. Cl. ............................................. A01f 12/10
[58] Field of Search.............. 130/27 R, 27 J, 27 JT, 130/27 L, 27 S; 56/10.2, DIG. 15

[56] References Cited
UNITED STATES PATENTS

| | | | |
|---|---|---|---|
| 3,675,660 | 7/1972 | Girodat | 130/27 JT |
| 2,452,153 | 10/1948 | Ronning et al. | 56/DIG. 15 |
| 3,606,745 | 9/1971 | Girodat | 130/27 J |

Primary Examiner—Antonio F. Guida
Attorney, Agent, or Firm—Robert L. Farris

[57] ABSTRACT

A stone trap door in the path of feeding of crop material in a combine harvester is held in a closed position by a solenoid controlled latch. The solenoid is energized to open the stone trap door and an electric clutch is de-energized to stop the drive mechanism by an electronic rock-detection circuit. The rock-detection circuit includes a piezo-electric ceramic disc attached to the bottom of the table to detect vibrations induced in the bottom of the table by material conveyed along the bottom of the table toward the trap door. The piezoelectric ceramic disc produces output signals which vary in frequency and amplitude depending upon the frequency and amplitude of the vibrations induced in the bottom of the table. The signals produced by rocks or other hard objects are amplified and rectified to energize the solenoid and a relay to open the stone trap door and to de-energize the electromechanical clutch means to stop the crop-handling drive mechanism.

9 Claims, 3 Drawing Figures

PATENTED APR 23 1974      3,805,798

COMBINE HARVESTER PROTECTION SYSTEM

The present application is in substance related to applicant's co-pending application, Ser. No. 139,428, filed May 3, 1971 for Combine Stone Trap Door.

BACKGROUND AND SUMMARY OF THE INVENTION

This invention relates to combine harvester-thresher, and more specifically, to a rock trap for removing rocks from the machine to prevent damage.

Rock traps are old and well-known in the art. One type that is commonly used includes a recessed area in front of the concave. When a rock strikes the concave bars or cylinder bars, it is forced into a recessed area, if the recessed area is not already full of rocks. The operator has to remember to empty the recessed area periodically to ensure that it does not become over filled with rocks. Quite often a rock will extensively damage or even stop the elevator to the threshing mechanism before it reaches the recessed area. If the elevator to the threshing mechanism conveys a rock towards the concave or cylinder, some damage will usually occur to at least some of the cylinder bars before the rock is forced into the recessed area.

Another type of rock trap commonly used on combine harvester-threshers incorporates a trap door and an over-load release latch. The trap door is preferably at the forward portion of the concave and under the cylinder. When a rock enters the concave or the cylinder, the over-load release latch releases the trap door and allows the rock to fall on the ground. This type rock trap has several limitations. The conveying mechanism in front of the cylinder may be damaged; the cylinder bars contact the rock and apply pressure on the trap door resulting in possible damage to the cylinder bars; and the trap door is often difficult to close due to its location and the design of the over-load release latch.

Generally, in all of these known mechanisms employing rock traps or releasable trap doors designed to remove rocks or other foreign objects in the crop material before the crop material enters the threshing mechanism, there is no assurance that the rocks or other hard destructive objects will be effectively removed. Similarly, rocks or other hard objects moved by the crop material through the auger mechanism and towards the elevator, if not properly detected, may cause serious damage to the elevator mechanism. Similarly, if the rock trap is full, stones or other hard objects will be passed along by the continuously operating crop-handling mechanism and cause serious damage to the threshing mechanism. Likewise, an open trap door in the bottom of the elevator housing or concave, during continuous operation of the crop-handling mechanism of the combine, may become temporarily clogged by crop material passed over the trap door opening and prevent stones or other hard objects from falling through the opening as intended and may cause serious damage to the combine harvester mechanism.

Accordingly, the rock trap of the present invention for a combine harvester-thresher, includes a trap door in the path of feed of crop material. An electronic detection device detects the presence of rocks or other relatively large and heavy destructive objects mixed with the crop material and is effective to release a latch to open the trap door to permit the rocks or other foreign objects to fall out of the machine.

Simultaneously, the electronic detection device of the present invention is effective to temporarily interrupt the drive for the crop-handling mechanism of the combine in the presence of any rocks or other foreign objects carried by the crop material to positively prevent damage to the crop-handling mechanism. The drive will be reactivated after the rocks or other foreign objects have been removed from the machine through the trap door or by hand.

The electronic rock-detection device of the invention employs a piezo-electric ceramic disc attached to the bottom of the table or elevator housing in front of the trap door and forwardly of the elevator mechanism and over which the crop material must pass. The vibrations induced by the rocks or other foreign objects, which may be present in the crop material are sensed by the piezo-electric device, causing release of the solenoid controlled door latch while simultaneously de-energizing an electro-mechanical clutch to stop the drive to the crop-handling mechanism. An electro-mechanical device to stop the forward travel of the combine may also be de-energized.

DETAILED DESCRIPTION OF THE INVENTION

Figure 2:
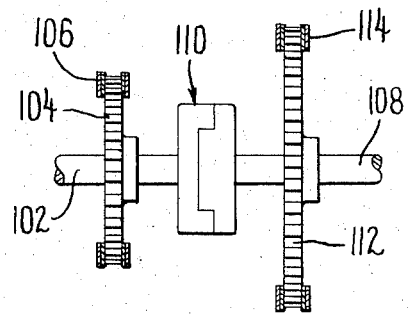
FIG. 2 is a fragmentary schematic illustration of the electro-mechanical clutch arrangement connecting the drive of the crop-handling mechanism with the primary power source of the harvester.

The combine harvester-thresher 10 employing the rock trap of this invention includes a table assembly 12, an elevator housing 14 to the threshing mechanism, an operator's platform 16, wheels 18 (only one of which is shown) to support and propel the combine, and a conventional threshing and cleaning assembly generally indicated by numeral 20. The operator's platform 16 includes a seat 22, a steering wheel 24 and the necessary control means to control the operation of the combine. The rear portion of the elevator housing 14 is pivotally attached to the front portion of the combine 10 for conveyance of material into the conventional threshing and cleaning assembly 20. The table assembly 12 is attached to the forward end of the elevator housing 14.

The table assembly 12 includes a table bottom 26. A plurality of guards 28 are attached to the forward edge of the table bottom 26. A reciprocal knife 30 is supported by the guards 28 and a plurality of knife clips hold the reciprocal knife in its proper position on the guards. A divider 32 and a divider guard 34 are mounted at each end of the table bottom 26. A table back plate 36 extends up from the table bottom and extends transversely from one divider to the other and is connected to the elevator housing 14. A pair of reel-support arms 38 are pivotally mounted to the outer ends of the table assembly 12 and rotatably support a reel 40, including a reel shaft 42, a plurality of spiders 44 connected to the reel shaft, and a plurality of reel bats 46 connected between the ends of the spiders 44. Reel 40, as is known is adapted to gather and hold crop material while the reciprocal knife 30 severs the crop material. As is also known, by means of the pivoted reel support arms 38, the reel can be adjusted up and down and forward and backwards relative to the reciprocal knife 30. An auger 48 is rotatably mounted between the dividers 32 and behind the reciprocal knife 30 to convey cut crop material to the center of the table assembly 12 and into the elevator housing 14.

The elevator housing 14 includes a bottom 50, side walls 52 and 54 and a top wall 56. A chain and slat-type conveyor is supported within elevator housing 14, composed of an elevator chain 58 and slats 60, and is trained around a drum 62 at the entrance end of the elevator housing 14. The chain drum 62 is rotatably and pivotally supported on a pair of arms 64 for up and down movement relative to the bottom 50 of the elevator housing 14. The chain and slat-type conveyor, is adapted to receive cut crop material from the table assembly 12 and convey the material upwardly through the elevator housing towards the rear and into the threshing and cleaning assembly 20. The crop material is moved between the lower run of the chain of the conveyor and the bottom 50 of elevator housing 14.

To prevent damage to the elevator mechanism and to the cylinder and concave of the threshing and cleaning assembly 20 by rocks or other hard destructive foreign objects mixed with the crop material, a trap door 66 is provided in the bottom 50 of the elevator housing 14 at the lower end thereof. The door may extend across the entire width of the bottom of the elevator housing from side wall 52 to side wall 54 or several of such trap doors 66 may be arranged side by side from side wall to side wall of the housing. Additionally, a trap door 66a may be provided in the table bottom 26 of the table assembly 12 instead of in the bottom of the elevator housing or, conversely, an additional trap door 66a may be provided in table bottom 26 in addition to the trap door 66 in bottom 50 of elevator housing 14.

Figure 3:
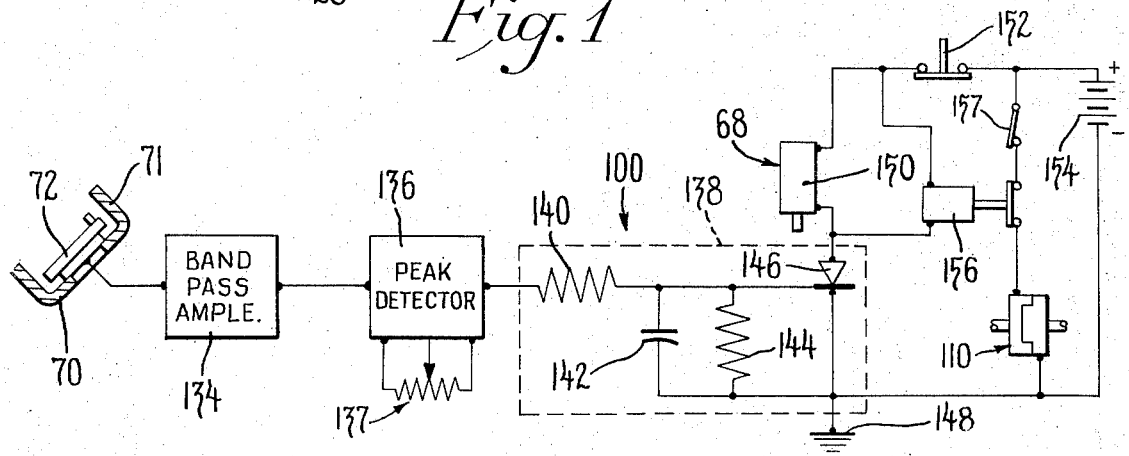
FIG. 3 is a schematic circuit diagram illustrating the electronic circuit of the rock detector of the present invention.

As shown herein, the trap door 66 is pivotally attached to the bottom 50 of elevator housing by conventional hinge means and is normally retained in closed position by latch assembly 68. Upon release of latch assembly 68, the trap door 66 will be caused to swing downwardly to open position, as shown in broken lines in FIG. 1, to permit the rocks or other foreign objects to fall out of elevator housing 14 to the ground. Latch assembly 68 is controlled by a sensing device 70 and a control circuit 100 which, when activated, is effective to operate the latch assembly 68 to open the trap door 66 in the presence of a rock or other foreign objects detected by the sensing device 70. The sensing device 70, in a preferred embodiment as best shown in FIG. 3, includes a piezo-electric ceramic disc 72 and a generally U-shaped mounting bracket 71 for attachment of the ceramic disc 72 to the table bottom 26 of table assembly 12 forwardly of trap door 66.

The preferred sensing device functions in the following manner: Crop material conveyed along the table bottom 26 of table assembly 12, by means of rotation of auger 48, induces vibrations in the table bottom 26 of the table assembly and in the auger 48. These vibrations are picked up by the piezo-electric ceramic disc 72. Accordingly, the piezo-electric ceramic disc 72 produces an output voltage which varies in frequency and amplitude, depending on the strength of the vibrations induced in the table bottom 26 and auger 48 by the material moved by the auger. The output voltage signals from sensing device 70 are then amplified and filtered to pass on only voltages at a frequency above a pre-determined value. It has been determined that voltages produced by vibrations induced by the moving crop material have relatively low frequencies within an easily definable range, while those voltages produced by vibrations of rocks or other relatively heavy foreign objects in the crop material are of considerably higher frequencies above the defined low-frequency range of pure crop material. Accordingly, the voltages in the higher frequency range are filtered out and passed on to a suitable amplifier and rectifier circuit which is electrically connected to the latch assembly 68, as will be more fully described, to operate latch assembly 68 to open trap door 66 for ejection of the rocks or other foreign objects through the trap door opening.

Figure 1:
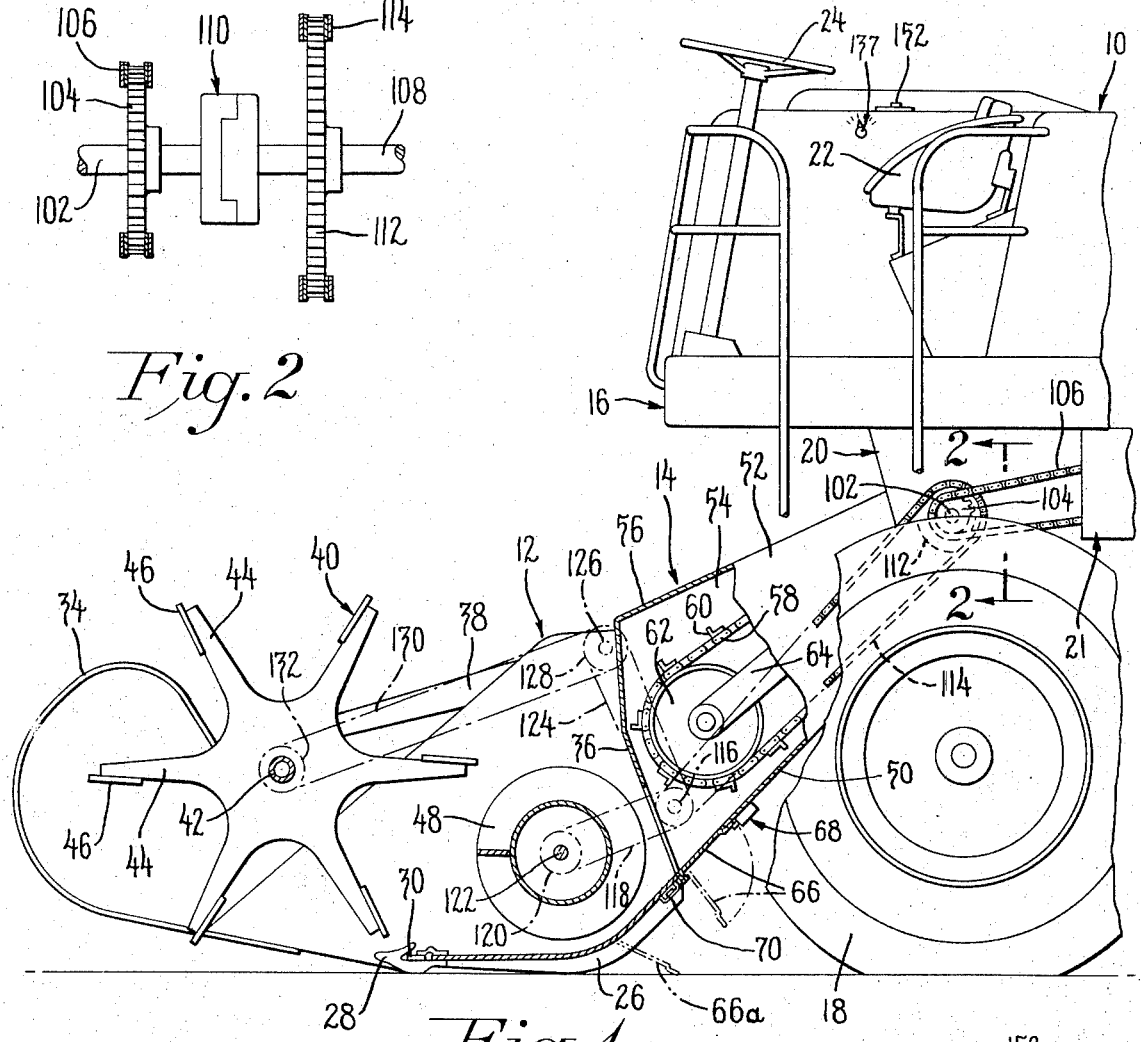
FIG. 1 is a partially broken away side elevation of the forward portion of a combine harvester-thresher, showing the rock trap of the present invention.

With reference to FIGS. 1 and 2, the various crop-handling components on the table assembly 12 and elevator housing 14, are drivingly connected to a powered driving mechanism of the combine 10 schematically indicated at 21. Thus, for example, and as schematically illustrated in FIG. 1 and 2, the rear or upper end of elevator chain 58 is trained around a driven shaft 102 supported in the main frame of the combine. Attached to the driven shaft 102 is a sheave or sprocket 104, which is drivingly connected by a drive belt or chain 106 to the driving mechanism 21 of the combine 10 in conventional manner. Per example, driven shaft 102 is coaxially drivingly connected to a drive shaft 108 by means of an electro-mechanical clutch 110, as schematically illustrated in FIG. 2. Drive shaft 108 similarly supports a sheave or sprocket 112 which is drivingly connected by means of chain or belt 114 to an intermediate drive shaft 116a supported in the front section of elevator housing 14. Intermediate shaft 116 supports suitable drive members such as sheave or sprockets for rotatable drive connection with auger 48 by means of chain or belt 118 and sprocket 120 supported on shaft 122 of auger 48. A further drive chain or belt 124 connects intermediate drive shaft 116 to a second intermediate drive shaft 126 in the upper end of table assembly 12.

The second intermediate drive shaft 126 is drivingly connected by means of sprocket or sheave 128 and chain or belt 130 to sprocket or sheave 132 supported on reel shaft 42 of the reel 40. It will be understood that there may be a further drive connection between second intermediate drive shaft 126 and reciprocable knife 30, as is known in the art.

Thus, the various crop material moving components, reciprocal knife 30, reel 40, auger 48 and elevator chain 58 are drivingly connected to the powered driving mechanism 21 of the combine by known interconnected drive arrangements, which may be different from that exemplarily illustrated in FIG. 1.

Power transmission for the various driven components of table assembly 12 and elevator housing 14 is selectively controllable by provision of the electromechanical clutch means 110 between the driven shaft 102 and primary drive shaft 108 so that, when electromechanical clutch 110 is disengaged, power transmission from the driving mechanism of the combine to the various driven components at the forward end of the combine will be interrupted.

In accordance with the present invention, the electro-mechanical clutch means 110 is similarly electrically connected to the sensing device 70 via the control circuit 100, as will be more fully described, so that upon detection of rocks or other foreign objects carried by the crop material and conveyed along the bottoms 26 and 50, will cause release of the latch mechanism 68 to open trap door 66 as well as simultaneous disengagement of electro-mechanical clutch means 110 to interrupt power transmission from driving mechanism 21.

With particular reference now to FIG. 3, the control circuit 100 of the present invention includes a band-pass amplifier 134 which is electrically connected to the piezo-electric ceramic disc 72 of sensing device 70. The band-pass amplifier 134 is adapted to amplify the voltage signals received from the sensing device 70 in correspondence with the induced vibrations caused by the material moved by the auger 48. The band-pass amplifier 134 screens and filters out any voltage signals of a frequency above a predetermined low-frequency value. The filtered-out voltage signals of a higher frequency than the lower voltage signals produced by vibrations of the pure crop material, are then fed into the peak detector circuit 136 to pass only signals of discrete amplitude which is selected by the sensitivity control 137. The amplifying and limiting circuit 138 includes a capacitor 142, resistors 144 and 140, and a silicon controlled rectifier 146. The circuit is properly grounded at 148.

The output of the amplifying and limiting circuit 138 is connected to a solenoid 150 which forms part of the latch mechanism 68. The other side of solenoid 150 is connected to one pole of a reset switch 152. The other pole of reset switch 152 is connected to a power source such as 12 volt battery 154. The output of amplifying and limiting circuit 138 is further connected to a relay 156 with one side of the normally closed pole connected to the manual ON-OFF switch 157 and the other normally closed pole connected to the electro-mechanical clutch 110. The electro-mechanical clutch 110 is also connected to the ground 148. The other pole of the manual ON-OFF switch is connected to the battery 154. The manual ON-OFF switch 157 is provided to allow the operator to operate the electro-mechanical clutch manually.

The reset switch 152, in the illustrated embodiment in FIG. 3, is a manual reset switch normally located at the operator's controls on operator's platform 16 of the combine 10. However, amplifying and limiting circuit 138 may be omitted and replaced by a conventional mono-stable switch for automatic reset, eliminating the manual reset switch 152.

In operation of the device, when the combine 10 is in operation and with the trap door 66 in closed position, crop material is gathered by the reel 40 and moved over the reciprocal knife 30 which cuts the standing crop. The cut crop is then picked up by the auger 48 and moved upwardly in table assembly 12 towards the rear and into the elevator housing 14 across the trap door 66 for pick-up and conveyance of the crop material by the elevator chain 58. If only pure crop material is present in table assembly 12 and elevator housing 14, the vibrations induced on the bottoms 26 and 50 by movement of the material, are of such low frequency as not to affect activation of the working parts of control circuit 100. However, since the guards 28 of table assembly 12 are normally in close proximity to the ground over which the combine travels, to cut the crop as close to the ground as possible, stones, debris and other relatively heavier foreign objects are liable to be picked up by the guards and conveyed with the cut crop material along the table bottom 26 and into the elevator housing 14. The vibrations now being introduced by the hard and relatively heavier foreign objects are picked up by the sensing device 70 as they pass over it and produce output signals at considerably higher frequencies than the output signals produced by the pure crop material. The signals from sensing device 70 are received by band-pass amplifier 134 for amplification and filtering of the signals to pass only the signals of higher frequency range into the peak detector circuit 136. The detected signals are transmitted by the amplifying and limiting circuit 138 causing energization of solenoid 150 and following that the release of the latch mechanism 68, causing the spring loaded trap door 66 to pivot into open position. Simultaneously with energization of solenoid 150, the relay 156 is energized to cause de-energization of electro-mechanical clutch 110 to thereby break the drive connection between driven shaft 102 and primary drive shaft 108, thus stopping rotation of the driven components on table assembly 12 and in elevator housing 14. A similar clutch arrangement could be used to stop the forward travel of the combine 10 so as to prevent tramping down the uncut crop.

Obviously, this arrangement provides an added safety factor to positively prevent damage to the crop-handling mechanism in any such instances where the foreign object has not been removed through the trap door opening.

For convenience, the sensing device 70 may be connected to an oscillograph, frequency indicator or the like for visual indication to the operator of the combine whether any rocks or other foreign objects are still present in the table or elevator bottom so as to permit the operator to reset switch 152 to re-energize the electro-mechanical clutch 110 and re-establish drive connection between the driven crop handling components and the main drive of the combine.

As mentioned before, the silicon controlled rectifier 146 can be replaced by a mono-stable switch together with a suitable time delay to permit automatic reset once the foreign objects have been removed from the mechanism. Other suitable indicator devices may be coupled with the sensing device 70 to indicate to the operator that the sensing device 70 has detected rocks or other hard objects on the bottoms of table assembly 12 or elevator housing 14.

It will also be understood that solenoid 150 for operation of the latch mechanism 68 may be of the push-pull type suitably connected by linkage or other means to the trap door 66 to permit automatic closing and opening of trap door 66 by solenoid 150 or other electro-hydraulic means.

Although the present invention has been described by means of a preferred embodiment, it will be obvious to persons skilled in the art to which the invention pertains, that various changes and modifications in arrangement and detail may be made without departing from the spirit and essential characteristic of the invention as defined by the scope of the appended claims.

I claim:

1. A combine harvester protection system for use in a combine harvester-thresher, having a power source and a threshing and separating unit, a table assembly and an elevator housing and driven members on said table assembly and in said elevator housing for conveying crop material to the threshing and separating unit, the improvement characterized by an electronic rock detection device capable of detecting the presence of hard foreign objects mixed with the crop material harvested by said combine; an electro-mechanical clutch means for selective driving connection of said driven members for conveying crop material to the threshing and separating unit with the power source of said combine, said clutch means being disengaged in response to a signal received from the electronic rock detection device indicating the presence of hard foreign objects mixed with the crop material to interrupt drive transmission between said power source and said driven members for conveying crop material to the threshing and separating unit.

2. The improvement of claim 1 characterized by said electronic detection device including a piezo-electric ceramic disc attached to the bottom of said table assembly.

3. The improvement of claim 2 characterized by said electronic rock detection device comprising a circuit including a band-pass amplifier, a peak detector, a solenoid, and a relay for operation of said clutch means.

4. The improvement of claim 3 characterized by said circuit further including a rectifier means between said peak detector and said solenoid and relay, and a reset switch for reengagement of said clutch device.

5. The improvement of claim 3 characterized by said circuit further including a mono-stable switch means between said peak detector and said solenoid and relay.

6. The improvement of claim 3 characterized by the further provision of a trap door in the path of feed of crop material, said trap door having a latch mechanism capable of opening the door in response to said signal received from said electronic detection device; and said solenoid being operatively connected to said latch mechanism.

7. The improvement of claim 6 characterized by said trap door extending across the bottom of the lower end of the elevator housing.

8. The improvement of claim 6 characterized by said trap door extending across the bottom of said table assembly.

9. The improvement of claim 6 characterized by at least one trap door being provided in the bottom of said elevator housing and at least one trap door being provided in the bottom of said table assembly.

* * * * *